J. W. DUNN & H. J. RANDALL.
SAW TOOTH.
APPLICATION FILED MAR. 6, 1909.
940,518.
Patented Nov. 16, 1909.
Fig. 1.
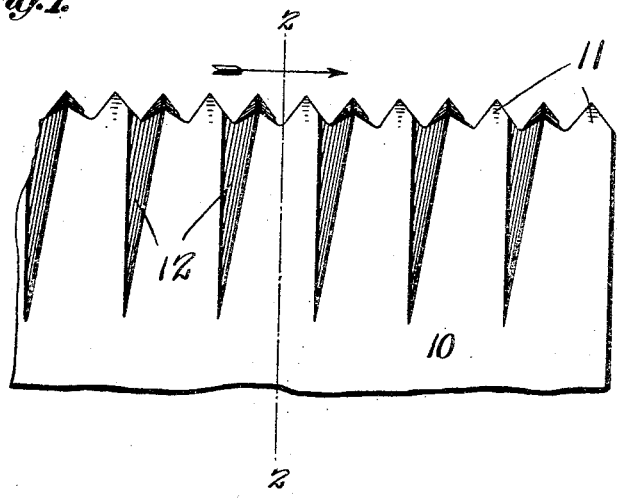
Fig. 2.
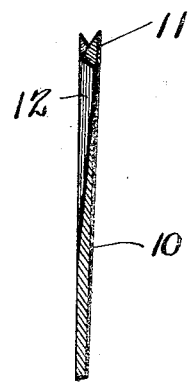
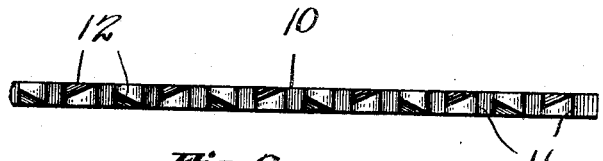
Fig. 3.
Witnesses
Chas. C. Richardson
W. C. Gillis
Inventors
John W. Dunn and
Herman J. Randall,
By Chandler & Chandler
Attorneys.

UNITED STATES PATENT OFFICE.

JOHN W. DUNN AND HERMAN J. RANDALL, OF ALGER, MICHIGAN.

SAW-TOOTH.

940,518.  Specification of Letters Patent.  Patented Nov. 16, 1909.

Application filed March 6, 1909. Serial No. 481,590.

*To all whom it may concern:*

Be it known that we, JOHN W. DUNN and HERMAN J. RANDALL, citizens of the United States, residing at Alger, in the county of Arenac, State of Michigan, have invented certain new and useful Improvements in Saw-Teeth; and we do hereby declare the following to be a full, clear, and exact description of the invention, such as will enable others skilled in the art to which it appertains to make and use the same.

This invention relates to saws and more especially to a novel form of saw tooth.

The principal object of the invention is to provided an improved form of teeth for the ordinary handsaw which will readily clear themselves without making it necessary to form the saw with a separate type of clearer teeth.

The invention further consists in certain novel details of construction and combinations of parts hereinafter fully described, illustrated in the accompanying drawings, and specifically set forth in the claims.

In the accompanying drawings like characters of reference indicate like parts in the several views, and Figure 1 is a side elevation of a portion of a saw blade constructed in accordance with this invention. Fig. 2 is a section on the line 2—2 of Fig. 1. Fig. 3 is an edge view of several of the teeth.

Numeral 10 indicates the body of the blade and this body is provided with a series of teeth 11 of ordinary form common in handsaws, that is to say, these teeth are substantially triangular in shape and provided with beveled faces.

Considering the teeth as divided into sets of two, between each of said sets is a groove 12 which is preferably triangular in cross section, one edge of the groove beginning at substantially half way down the side of one tooth and extending perpendicular to the cutting faces of the saw, while the other edge of the groove extends substantially from the point of the next adjacent tooth and rakes backward to intersect the first mentioned edge, thereby forming a groove which is deepest at the cutting edge and which gradually merges into the face of the body 10. The grooves as thus arranged are spaced a distance apart equal to the space of two teeth and these grooves are formed on each side of the saw, the grooves on one side being in staggered relation to the grooves on the opposite side. Experience has shown that there has thus been provided a highly efficient form of saw tooth which has extremely rapid cutting qualities and which clears itself from the chips in a superior manner. Furthermore, this form of tooth not only cuts rapidly but the grooves act to plane the cut surface and leave the cut in a perfectly smooth condition.

Having thus described the invention, what is claimed as new, is:—

1. A saw provided with a series of equiform and equispaced teeth and having a series of grooves upon each side of the blade dividing the teeth in sets of two on each side, the grooves upon one side being in staggered relation to the grooves upon the opposite side of the blade.

2. A saw provided with a series of equiform and equispaced teeth and having a series of grooves upon each side of the blade dividing the teeth in sets of two on each side, the grooves upon one side being in staggered relation to the grooves upon the opposite side of the blade, said grooves being substantially triangular in cross section.

3. A saw provided with a series of equiform and equispaced teeth and having a series of grooves upon each side of the blade dividing the teeth in sets of two on each side, the grooves upon one side being in staggered relation to the grooves upon the opposite side of the blade, said grooves being substantially triangular in cross section and tapering from the teeth toward the back of the blade.

In testimony whereof, we affix our signatures in presence of two witnesses.

JOHN W. DUNN.
HERMAN J. RANDALL.

Witnesses:
NELSON IRELAND,
SCOTT CILLEY.